United States Patent [19]
Pisa

[11] Patent Number: 5,988,112
[45] Date of Patent: Nov. 23, 1999

[54] ANIMAL SEPARATORS FOR WAITING ROOMS

[76] Inventor: Anna Crispino Pisa, 1 Fairmont Ter., West Nyack, N.Y. 10094

[21] Appl. No.: 09/253,921

[22] Filed: Feb. 22, 1999

[51] Int. Cl.⁶ .................................................. A01J 1/00
[52] U.S. Cl. .......................................... 119/479; 119/28.5
[58] Field of Search .................................... 119/479, 452, 119/474, 482, 502, 512, 161, 165, 905, 28.5; D6/329, 334, 335, 360, 364

[56] References Cited

U.S. PATENT DOCUMENTS

| | | | |
|---|---|---|---|
| 5,184,568 | 2/1993 | Healey | 119/165 |
| 5,283,962 | 2/1994 | Humann | 119/15 |
| 5,357,900 | 10/1994 | Ho | 119/19 |

*Primary Examiner*—Thomas Price
*Attorney, Agent, or Firm*—Richard A. Joel, Esq.

[57] ABSTRACT

An animal separator particularly for waiting rooms in animal hospitals comprises an enclosed pet resting area for isolating pets and an integral chair for the owner. The resting area comprises a base having a raised side portion and end portions at the front and rear extending upwardly therefrom substantially at right angles. A pull out drawer is located beneath the base for ease of cleaning while a forward hinged door is located in the base of the unit to permit the base to move upwardly from the rear to deposit waste through the door into the drawer. The sides and end portions include a plurality of spaced apertures to permit an open feeling for the pet. The front end portion includes a slight lip to encourage the pet such as a dog to remain on the base which is grooved to permit ease of movement. A chair may be integrally molded to a one side of the separator adjacent the entrance side or the legs thereof may be inserted in a pair of elongated slots positioned adjacent the wall on the entrance side.

11 Claims, 4 Drawing Sheets

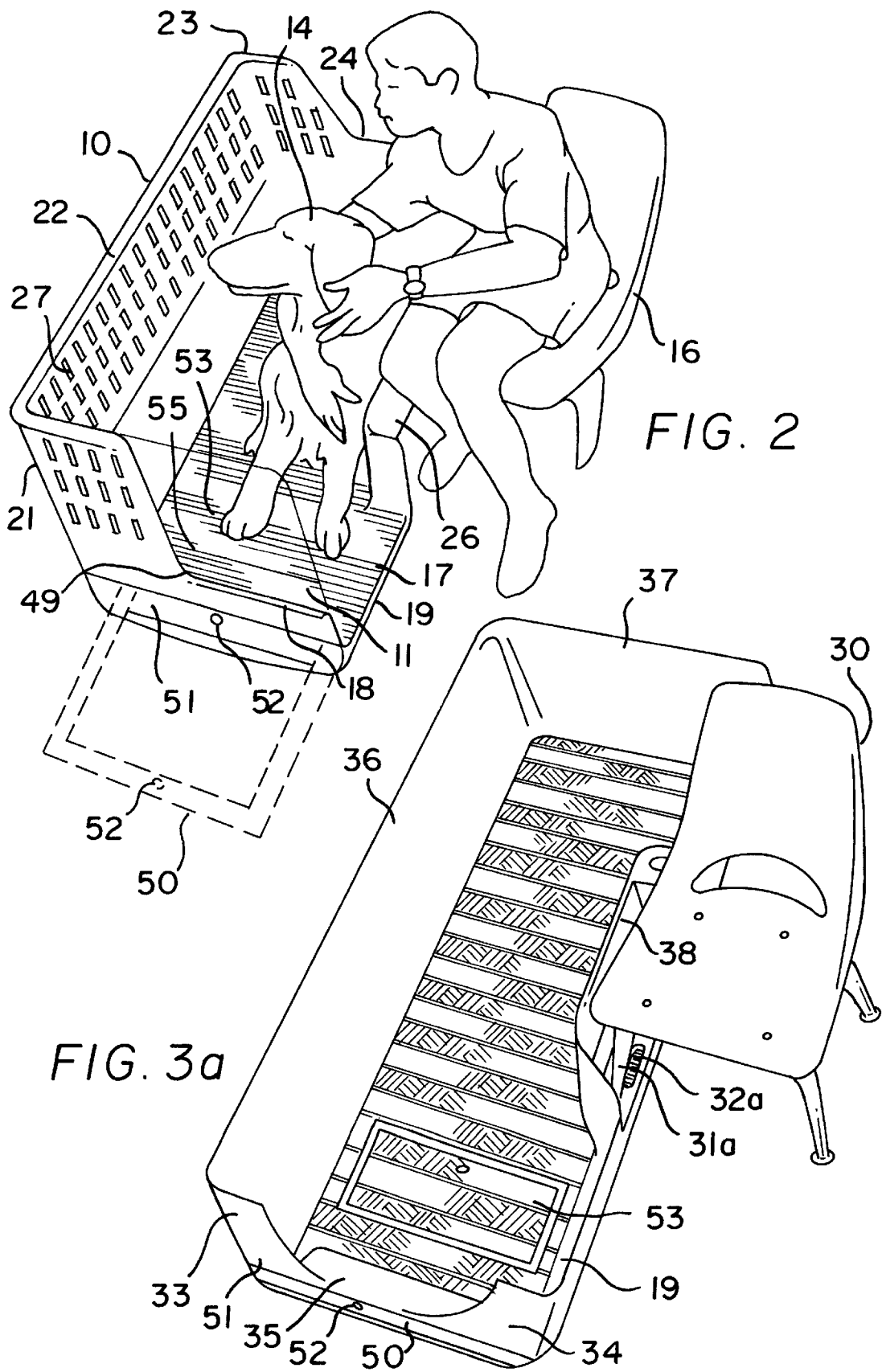

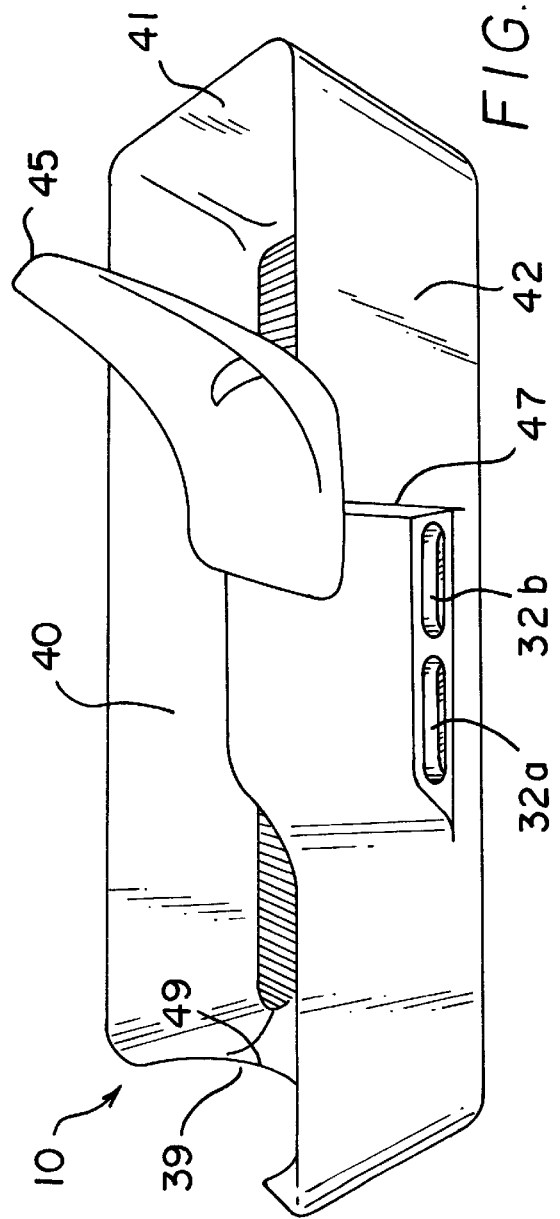
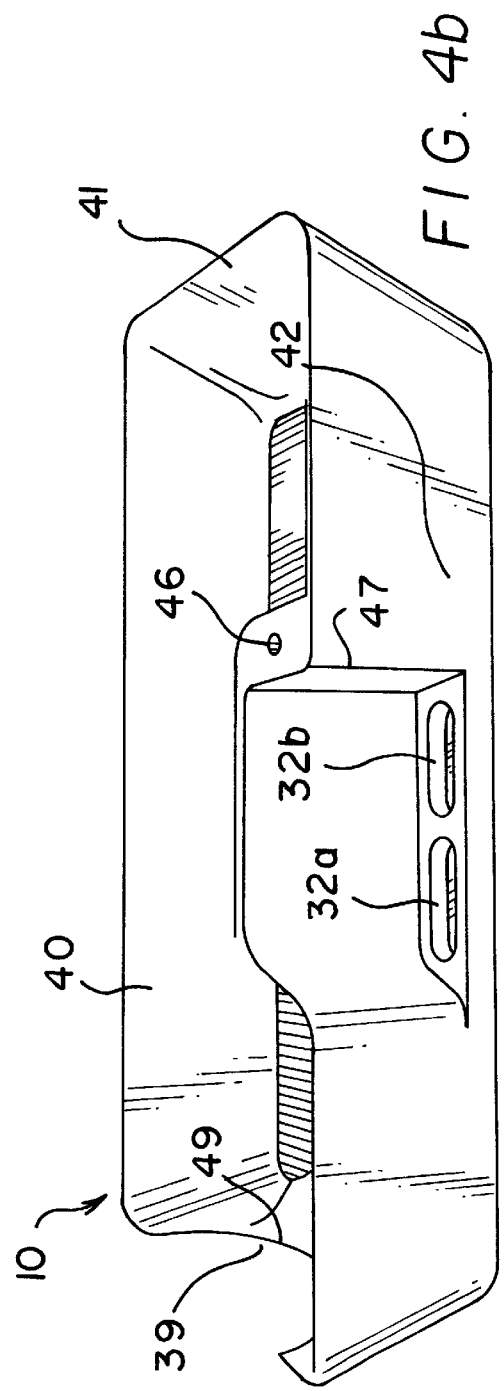

ANIMAL SEPARATORS FOR WAITING ROOMS

BACKGROUND OF THE INVENTION

1. Field of the Invention

This invention relates to animal separators for waiting rooms particularly in veterinary offices and hospitals.

2. Description of the Related Art Including Information Disclosed Under 37 CFR §§1.97–1.98

The invention comprises a resting area for a pet in a waiting room which is cordoned off from other similar areas and includes an integral chair for the pet owner. This novel and efficient arrangement keeps the pets separated and at ease in contrast to the situation in most waiting rooms where the pets are in a high state of anxiety due to the other pets nearby.

Generally, the pets are on the floor or on their owner's laps while waiting to be seen by the veterinarian. In an often crowded office this can lead to chaos. There is a definite need for a device or apparatus to separate the pets in a waiting room. Such a device should be economical, easy to use, and adaptable to different office arrangements.

In the prior art, U.S. Pat. No. 903,218 to MIDDLE-BROOKE discloses a foldable dog bed with various separators to keep the dogs apart.

U.S. Pat. No. 4,659,972 to KILBURN discloses a portable free stall comprising a base and two long channels and two short channels arranged at right angles to form a rectangular configuration. Individual stalls are formed by a plurality of longitudinally spaced upright angles which are secured along one of the longitudinal channels.

U.S. Pat. No. 2,720,861 to STROUP discloses a bedding device for animal stalls while U.S. Pat. No. 3,006,319 to McCRORY and U.S. Pat. No. 5,211,130 to ELIAS disclose animal and, in particular, dog beds.

U.S. Pat. Nos. 42,730; 135,425 and 388,191 show the combination of a chair with another piece of furniture such as a cradle but are otherwise irrelevant.

In general, none of the above patents are even close to the present invention which solves a unique problem in an unobvious manner. The invention provides security eliminating the possibility of attacks by more aggressive pets while providing a comfortable and attractive environment for both pets and their owners.

SUMMARY OF THE INVENTION

A pet separator for waiting rooms comprises an integral chair with an enclosed pet resting area.

The pet resting area comprises a floor or base with transverse grooves to prevent dogs from sliding and sides extending upwardly therefrom about the base the periphery thereof. One raised side along the length of the base opposite the chair includes a plurality of ventilator holes and is designed to act as the separator. In one embodiment, the opposite or pet entrance side includes a lower wall portion having a chair mounted thereto and a still lower entrance section to facilitate entry by a pet. The rear side of the separator includes a raised portion extending downwardly to a lower wall portion while the front side includes a raised wall portion connected to the separator side and a lower lip portion.

In an alternate embodiment, the side walls and the rear wall may be of the same height while the front wall would include a recessed entrance portion. In the alternate embodiment, the walls would not have ventilation holes to provide a greater degree of isolation.

The separators may also include a sliding pull out drawer beneath the base. A door in the forward portion of the base is hinged thereto and lifting the door from the rear permits waste to drop or be swept into the drawer below for ease of removal.

The chair may either be an integral part of the resting area in a one piece unit or may include a chair which is separately mounted to the separator. The invention thus permits an individual to sit in proximity to his pet in an atmosphere which is friendly to animal needs. The pets are separated in a waiting room into their own private areas while waiting to see a veterinarian. In contrast to existing waiting rooms where dogs have no choice but to stand, sit or lie down on slippery floors, the non-skid floor of the pet separator prevents dogs from sliding while permitting them to get up with ease.

Accordingly, an object of this invention is to provide a unique pet separator for animal waiting rooms.

Another object of this invention is to provide a unique pet separator for animal waiting rooms which includes a resting area and separator means for animals.

Another object of this invention is to provide a new and improved pet separator which includes a means to easily remove waste from the pet resting area.

A further object of this invention is to provide a new and improved pet separator for veterinary waiting rooms which includes an integral chair.

A still further object of this invention is to provide a unique separator for pets which includes a grooved base and raised sides extending upwardly therefrom on two sides and one end along the base periphery and an entrance portion along the other end to permit easy access by a pet.

A more specific object of this invention is to provide a portable animal separator for waiting rooms which is inexpensive and effective, said separator comprising a serrated non-slip resting area surrounded on three sides by walls having a plurality of spaced apertures and an entrance portion wherein the pet enters the separator resting area and a chair mounted thereto for the owner, said separator providing security and isolation for the pet while waiting, and a sliding drawer beneath the base and a hinged door connected to the base to facilitate waste removal.

BRIEF DESCRIPTION OF THE DRAWINGS

The above and other objects and advantages of this invention may be more clearly seen when viewed in conjunction with the accompanying drawings wherein:

FIG. 2 is a perspective view of a single separator in use;

FIG. 3a is a perspective view of an alternate embodiment of the invention with a detachable chair;

DETAILED DESCRIPTION OF THE INVENTION

Figure 1:
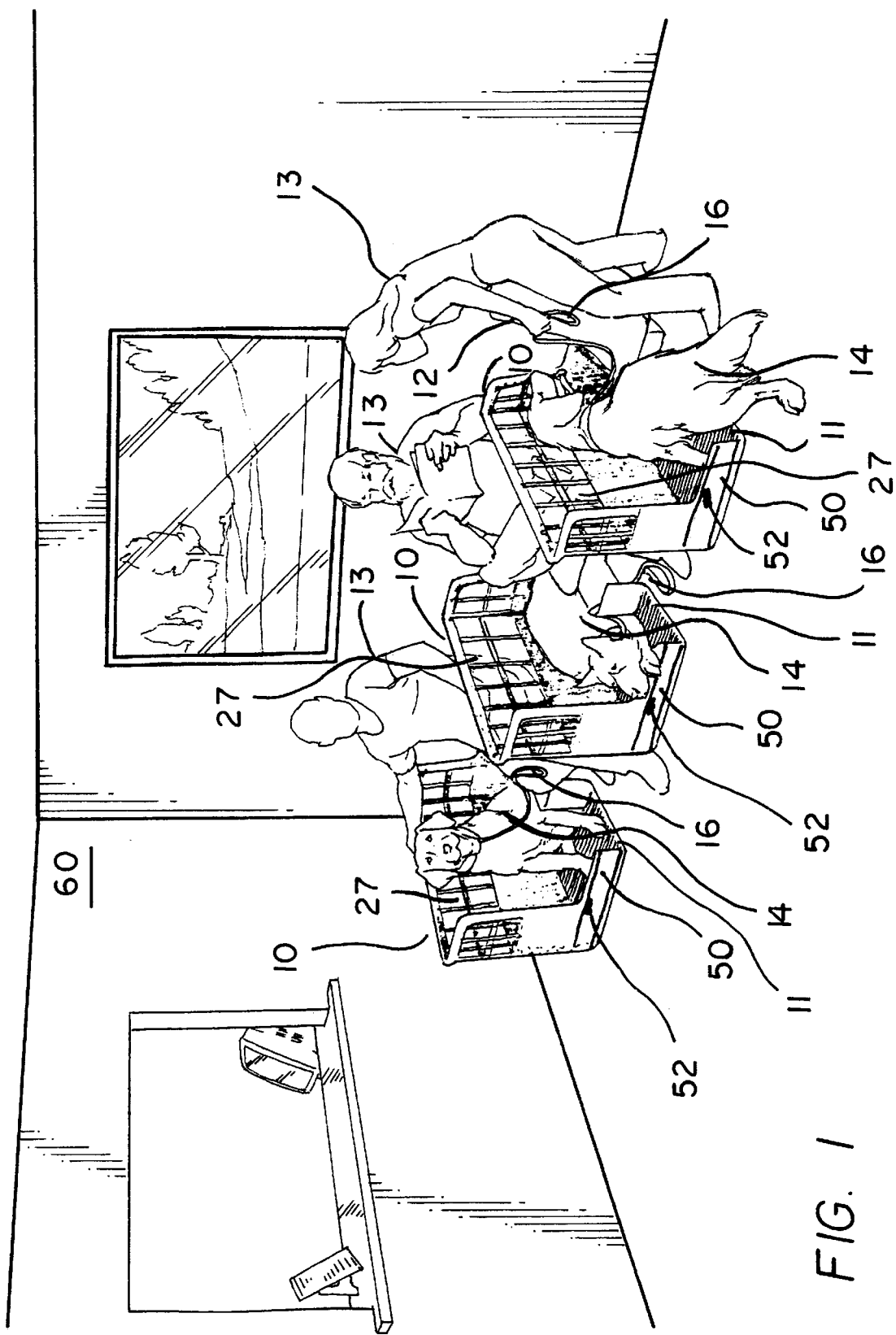
FIG. 1 is a perspective view of a waiting room illustrating a plurality of separators.

Referring now to the drawings, the invention as shown in FIG. 1 including an animal separator 10 comprising a pet resting area 11 and an integral chair 12 for the pet owner 13. A plurality of separators 10 are shown in FIG. 1 arranged in a waiting room 60.

The separators 10 are friendly to pet needs particularly dogs and cats since the possibility of attacks on pets 14 and/or humans 13 by more aggressive pets 14 is minimized. Besides security, the separators 10 provide a degree of comfort which does not exist in current waiting rooms. Ordinarily owners 13 are seated in chairs arranged side by side with little or no room therebetween while dogs 14 sit or lie down on cold and slippery floors. Owners 13 are often tugging on their pet's leash 16 to keep the pet 14 away from other pets and humans 13 and this can cause possible injuries to dogs 14 which may be experiencing throat or hip, problems.

Referring to the embodiment of FIG. 2, the separator 10 comprises a base or resting area 11 with a non-skid surface having a plurality of transverse grooves 17 which prevent dogs 14 from sliding. This is in contrast to conventional tiled floors which are difficult for dogs 14 to navigate. Typically, the separator 10 would be approximately 24 inches wide by 48 inches long and preferably constructed of plastic material.

Figure 3B:
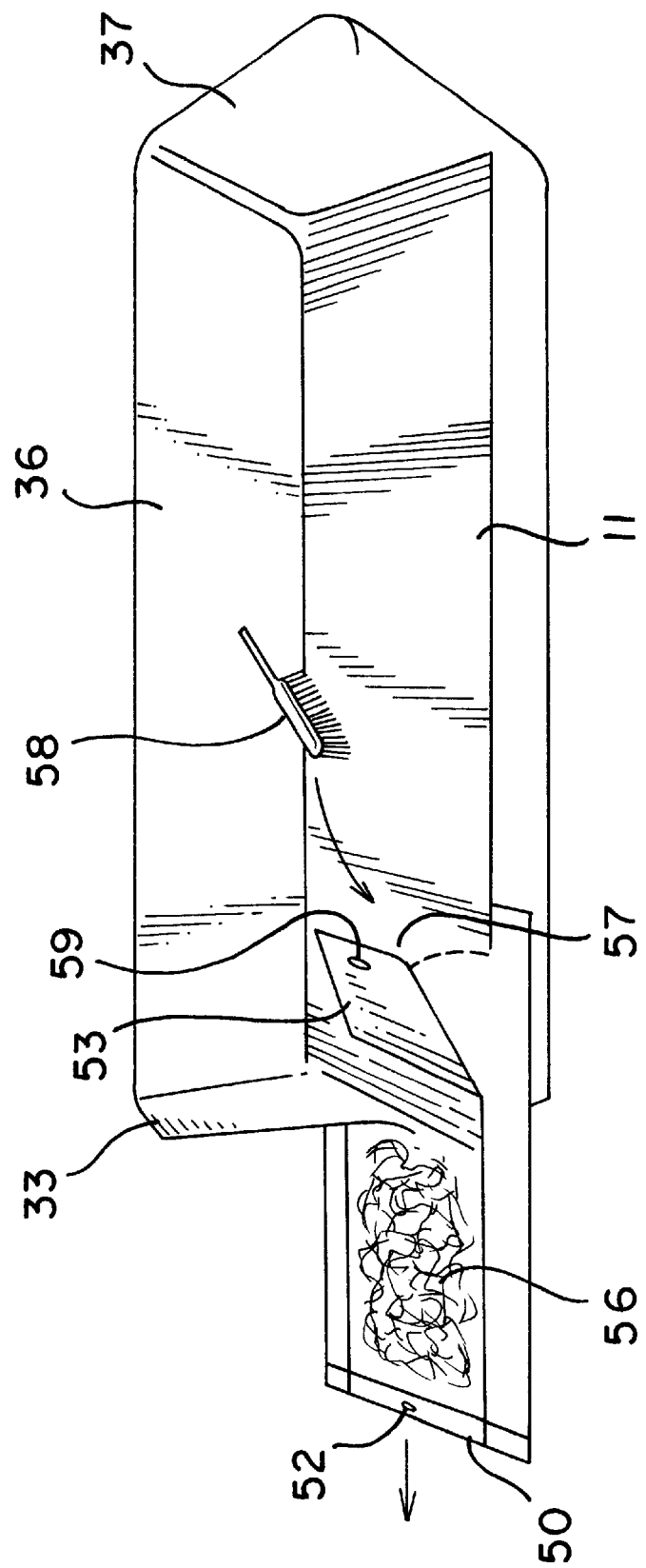
FIG. 3b is a partial side cross-sectional view showing the operating of the pull-out drawer and door for cleaning purposes; and, FIGS. 4a and 4b illustrate a side perspective view of an embodiment of the invention with an integral chair shown in FIG. 4a and with the absence of the chair in FIG. 4b.

The forward end of the separator 10 has a retainer lip 18 typically about 4 inches high adjacent the entrance 19 which extends rearwardly to form a headrest 49 and a raised portion 21 about 36 inches high. The raised portion 21 is formed integrally with the side portion 22 and the end portion 23 which drops off to a lower portion 24 approximately 16 inches high. Adjacent the other side of the entrance 19, is a raised side wall 26 having the chair 16 integrally mounted thereto. The raised portions 21, 22 and 23 may include a plurality of ventilation holes 27 arranged in a particular pattern. Typically, the ventilation holes would be ½ inch wide by 2 inches long. Generally, the bottom 16 inches of the walls would be solid. The separator 10 may also include a sliding drawer 50 located beneath the base 11 which is normally flush with the forward surface 51 of the separator and includes a handle or knob 52. A door 53, runs transversely across the base 11 and extends rearwardly about 4 inches. The door 53 which is best seen in FIGS. 3a and 3b is hinged to the base 11 at 55. In use, the door is lifted upwardly from the rear by handle or grip 59 depositing waste 56 into the drawer 50. The waste 56 may be swept into the drawer opening 57 with a broom 58. The drawer is then pulled outwardly and the dirt and pet hair removed.

FIG. 3a discloses an alternate embodiment of the invention including a separate chair 30 having a pair of legs 31a and 31b (not shown) which are positioned in recesses 32a and 32b respectively along the side with the entrance. The front end comprises raised wall portions 33 and 34 and a downwardly extending curved recess 35 to facilitate movement and ventilation for a pet. The walls 36, 37 and 38 may have a pattern of ventilating holes (not shown) similar to FIGS. 1 and 2.

FIGS. 4a and 4b are similar to FIG. 3 but have a curved entrance 39 in the forward end and all walls 40, 41 and 42 are the same height. Wall 42 curves inwardly at 47 where chair 45 is mounted. The chair 45 includes a downwardly protruding element (not shown) which engages hole 46 to permit swiveling of the chair 45. Optionally the separator 10 has a pair of recesses 32a, 32b for mounting chair legs of a removable chair 30 as shown in FIG. 3. The walls 40, 41 and 42 may also include a plurality of ventilation holes similar to FIGS. 1 and 2.

In operation, a dog 14 would be led into the separator 10 through entrance 19 in FIG. 1 or the recess 39 in FIGS. 4a and 4b. The owner 13 would sit on the chair 16 next to the dog 14 which sits or lies on the rest area 11 undisturbed by dogs 14 in adjacent separators 10. This compact and efficient arrangement is best seen in FIG. 1. As a further advantage, the separator 10 can be almost entirely molded of plastic resulting in a rather inexpensive yet useful product.

While the invention has been explained by a detailed description of certain specific embodiments, it is understood that various modifications and substitutions can be made in any of them within the scope of the appended claims which are intended also to include equivalents of such embodiments.

What is claimed, is:

1. A pet separator for waiting rooms to isolate pets and their owners from other pets comprising:

a pet resting area comprising a base having walls extending upwardly from the periphery along the length and both forward and rear ends thereof, one of said side walls having an entrance recess with one of said wall terminating at the entrance to permit entry of a pet; and, a chair mounted to the side wall adjacent the entrance.

2. A pet separator for waiting rooms to isolate pets and their owners from other pets in accordance with claim 1 wherein:

a forward side includes an upper wall portion and a lower lip portion.

3. A pet separator for waiting rooms to isolate pets and their owners from other pets in accordance with claim 2 wherein:

the base lip portion extends inwardly into the base forming a headrest.

4. A pet separator for waiting rooms to isolate pets and their owners from other pets in accordance with claim 1 wherein:

the base comprises a surface having a plurality of spaced transverse grooves to prevent pets from sliding.

5. A pet separator for waiting rooms to isolate pets and their owners from other pets in accordance with claim 4 wherein:

the side wall opposite the entrance and the forward rear walls include a plurality of spaced apertures to permit an open feeling for the pet.

6. A pet separator for waiting rooms to isolate pets and their owners from other pets in accordance with claim 4 wherein:

the side having the entrance recess includes pivotal coupling means for the chair on an upper surface thereof.

7. A pet separator for waiting rooms to isolate pets and their owners from other pets in accordance with claim 4 wherein:

the base includes a textured non-skid surface between the grooves.

8. A pet separator for waiting rooms to isolate pets and their owners from other pets in accordance with claim 1 further including:

a sliding drawer mounted beneath the rest area for ease of cleaning the separator and a door mounted in the forward portion of the rest area and having the base hinged thereto so that lifting the rest area from the rear permits waste material to be deposited into the drawer.

9. A pet separator for waiting rooms to isolate pets and their owners from other pets in accordance with claim 8 wherein:

the drawer is mounted in the forward portion of resting area and includes a knob for pulling said drawer outwardly.

10. A pet separator for waiting rooms to isolate pets and their owners from other pets comprising:

a pet resting area comprising a base having a pair of side walls and a rear wall extending upwardly from the periphery thereof and a recessed portion extending downwardly from the side walls at the forward end of the base to permit entry of a pet, and wherein one of said side walls extends inwardly at a right angle for a predetermined distance and then substantially parallel to the opposite side and pair of recesses at approximately base level adjacent the side wall in the vicinity of the inward extension, said recess accommodating the legs of a chair.

11. A pet separator for waiting rooms to isolate pets and their owners from other pets in accordance with claim 10 wherein:

the inward extension of the side wall includes an upper surface having an aperture for mounting a chair thereto.

* * * * *